United States Patent [19]

Cremona

[11] Patent Number: 5,035,164

[45] Date of Patent: Jul. 30, 1991

[54] DEVICE FOR CUTTING AND STACKING STRIPS OF WOOD

[75] Inventor: Lorenzo Cremona, Monza, Italy

[73] Assignee: Angelo Cremona & Figlio S.p.A., Milan, Italy

[21] Appl. No.: 474,948

[22] Filed: Feb. 5, 1990

[30] Foreign Application Priority Data

Feb. 10, 1989 [IT] Italy .............................. 19397 A/89

[51] Int. Cl.[5] ........................ B27L 5/08; B65G 15/04; B27B 1/00

[52] U.S. Cl. .......................................... 83/80; 83/100; 83/106; 83/155.1; 83/289; 83/371; 144/2 R; 144/356

[58] Field of Search ................. 83/78, 79, 80, 94, 100, 83/106, 289, 371, 408; 209/564, 586, 905, 518, 932; 144/2 R, 356, 357

[56] References Cited

U.S. PATENT DOCUMENTS

| | | | |
|---|---|---|---|
| 3,169,428 | 2/1965 | Owen | 83/104 |
| 3,199,555 | 8/1965 | Hildebrand | 83/80 |
| 3,264,917 | 8/1966 | Califano et al. | 83/94 |
| 3,461,759 | 8/1969 | Dixon et al. | 83/80 |
| 3,866,498 | 2/1975 | Jarman | 83/104 X |
| 4,809,574 | 3/1989 | Cremona | 83/80 |
| 4,989,651 | 2/1991 | Snellgrove | 144/356 |

*Primary Examiner*—W. Donald Bray

*Attorney, Agent, or Firm*—Finnegan, Henderson, Farabow, Garrett & Dunner

[57] ABSTRACT

A machine for cutting and stacking into layers sheets of a pre-established size from a plurality of strips of wood obtained from a piece of veneer. The pieces of veneer are fed into a cutter by means of a first conveyor belt actuated by a control means which detects flaws in the wood to cut out transverse strips containing the flaws that are then automatically discarded as they come off the cutter. Strips free from defects are then sent on by a second conveyor belt to a deflector which distributes the strips onto two conveyor belts with intermittent movement so as to arrange the strips into compact adjacent groups to form a sheet of desired length. The plurality of adjacent strips forming a sheet are then sent to stackers to form layers of the sheets.

8 Claims, 2 Drawing Sheets

10
11
12
13
14
15
16
17
18
19
20
21
22
23
24
25
26
27
28
29
30

DEVICE FOR CUTTING AND STACKING STRIPS OF WOOD

BACKGROUND OF THE INVENTION

One problem in woodworking is that of cutting veneer into strips, eliminating defects such as knots, holes, etc., laying the strips side by side and stacking them to form layers of sheets of pre-established width and length to be sent on to subsequent manufacturing steps. This invention relates to a device for carrying out such an operation completely automatically and at high speed.

SUMMARY OF THE INVENTION

This is achieved by providing a device for stacking superimposed sheets of strips placed side by side to form a sheet of pre-established dimensions, the strips being cut from a sheet of veneer, with elimination of its defective portions, in which the strips are conveyed from the outlet of the cutter by a first conveyor belt towards a second conveyor belt having a length not less than the corresponding length of the sheet to be formed, means being provided for measuring the width of each strip coming from the first conveyor belt to enable the second conveyor belt to advance by a step equal to the width of the strip when it receives the strip, and a device which adds up the width of the strips accumulated on the second conveyor belt and then discharges all the strips accumulated into a stacker, when the overall width is substantially equal to a pre-established dimension.

BRIEF DESCRIPTION OF THE DRAWINGS

The principles of this invention and its advantages will be more clearly evident from the following drawings, in which.

DETAILED DESCRIPTION OF THE INVENTION

Figure 1:
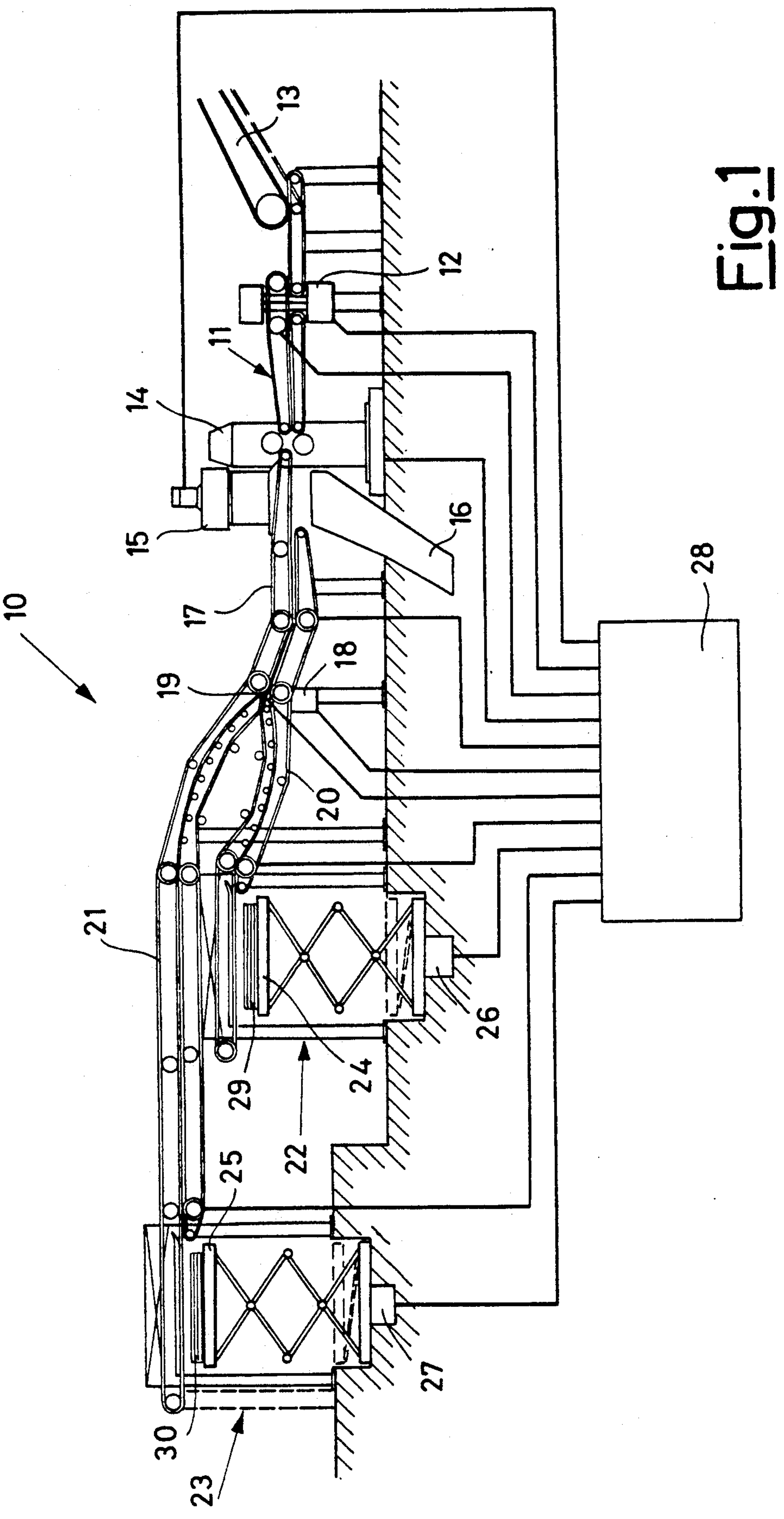
FIG. 1 shows a schematic view of a machine for cutting and stacking strips in pre-established sizes according to the present invention.

With reference to the figures, as can be seen in FIG. 1, the machine for cutting and stacking strips, generically indicated by reference 10, comprises a first conveyor belt 11 (the term "conveyor belt" will be hereinafter used to indicate a belt conveying system with belts and counterbelts as can be readily appreciated by those skilled in the art) along which is disposed a detection means such as an optical scanning device 12 of known type, for example with photodiodes, to detect flaws in a piece of veneer arriving from a conveyor system 13.

The conveyor belt 11 leads to a cutter 14 of know type, for example of the rotary type, with a cutting direction perpendicular to the direction of movement of the belt 11, the outlet of which lies adjacent from above with a separating means comprising a vacuum operated deflector 15 and from below with a collecting and conveying chute system 16.

A second conveyor belt system 17 is situated downstream of the cutter 14 with its counterbelts extending as far as the outlet of the cutter and its lower belts extending only as far as the deflector 15, as can be clearly seen in FIG. 1.

Disposed at the other end of the conveyor belt system 17 is a measuring means 18 for determining the width of the conveyed strips such as an optical sensor with photodiodes and a flap-type deflector 19 of known type for distributing the strips conveyed by the belt 17 onto a first lower belt with intermittent movement 20 or onto a second upper belt with intermittent movement 21.

Belts 20 and 21 lead to two stacking devices 22 and 23 of know type, comprised of movable shelves 24 and 25, which shift vertically from an upper position close to the belts to a lower position as shown by the broken lines in FIG. 1, and which are movable by means of actuators (for example, pneumatic) 26 and 27 respectively.

All the operations of the machine are monitored by a conventional electronic control means 28 (for example, wired logic or, advantageously, microprocessor-controlled) of known type and consequently (especially in the light of the following operating description) readily apparent to those skilled in the art. For this reason, its further description is considered unnecessary.

Figure 2:
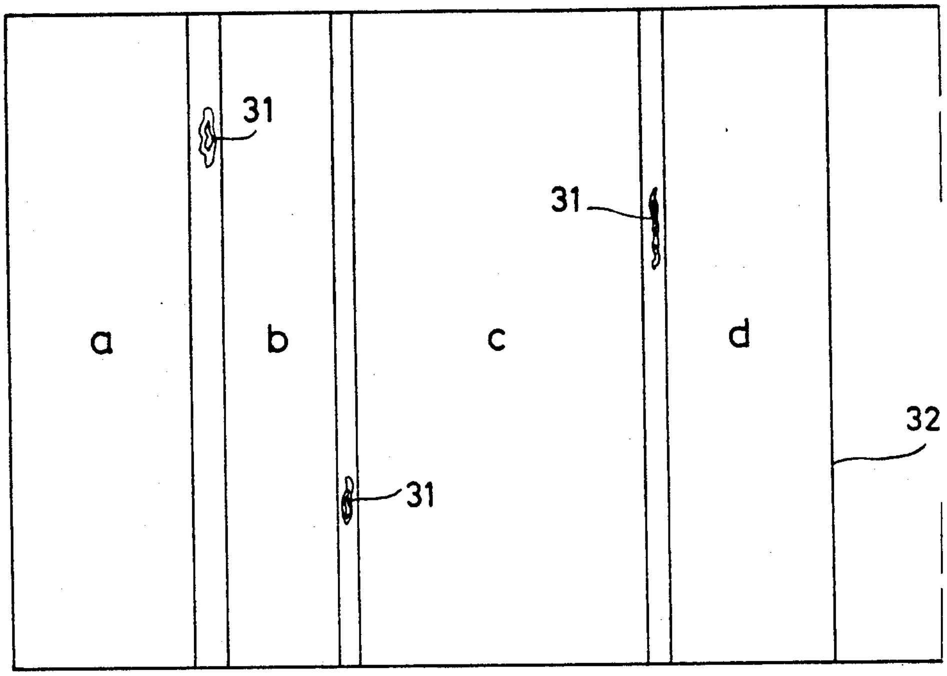
FIG. 2 schematically shows a sheet of veneer with lines of possible sections to be cut out by the machine of FIG. 1.

The above-described machine operates in the following way. The piece of veneer, conveyed by means of a belt 13 from previous phases of the process, is transferred onto the belt 11 and passes through the scanning device 12 which detects the presence of surface defects (knots, holes, etc.) and transmits the information to the control means 28 which actuates the cutter 14 in order to carry out the cuts extending perpendicular to the direction of travel of the piece of veneer in correspondence with the defects detected so as to isolate them in thin strips of a size just sufficient to contain the defect. This is schematically illustrated in FIG. 2, which shows cuts carried out in order to isolate defects generically indicated by reference 31.

At the outlet of the cutter, the sections of wood obtained are sorted into the strips free from defects and rejects or scraps containing the defects, by the vacuum-operated deflector 15. This selection is obtained by a control signal from the device 28 which actuates the vacuum of the deflector 15 when the piece discharged form the cutter is a strip free from defects, so that it adheres to the end of the upper counterbelts of the conveyor system 17 and is then conveyed by the system towards its other end. Conversely, when the piece discharged from the cutter is a strip containing a reject, the device 28 reverses the operation of the vacuum-operated deflector and blows the scrap into the chute 16 which conveys it elsewhere, for example towards manufacturing processes which require lower-quality material.

The strips which reach the conveyor belt system 17, in continuous motion, are spaced apart from one another a variable distance depending upon the width of the strip containing the reject removed from between them. On arrival of a strip with the sensor 18 the latter detects its leading edge and by means of the control device 28 actuates the flap 19 in order to send the strip to either of the intermittently moving belts 20, 21, and starts up the belt receiving the strip until it detects the trailing edge of the latter. In this way, the subsequent strips are transferred onto the belts 20 and 21 with their edges placed close together.

The cutter 14 is controlled by the device 28 to carry out the cuts in order to eliminate the defects and also to carry out cuts 32 in calculated positions so that a sequence of strips placed close together on the intermittently moving belts will form the desired length l of a sheet to be stacked. This is shown schematically in FIGS. 2 and 3 where the cut 32 is carried out in such a position that, by placing that strip d together with the strips a, b, c, obtained by the cuts made to eliminate the defects 31, the desired length l is obtained.

The control device 28 calculates the position of the cut 32 by adding up the lengths of the strips already placed side by side on the intermittently moving belts 20 or 21 which are measured by the sensor 18 as the strips pass by it, and signals the cutter to make the cut when a continuous length of veneer equal to the portion required to make up the length l has passed by it. This continuous length is measured due to the fact that the device 28 controls the speed of the belt 11 in order to synchronize it with the cutting operations according to known techniques.

Figure 3:
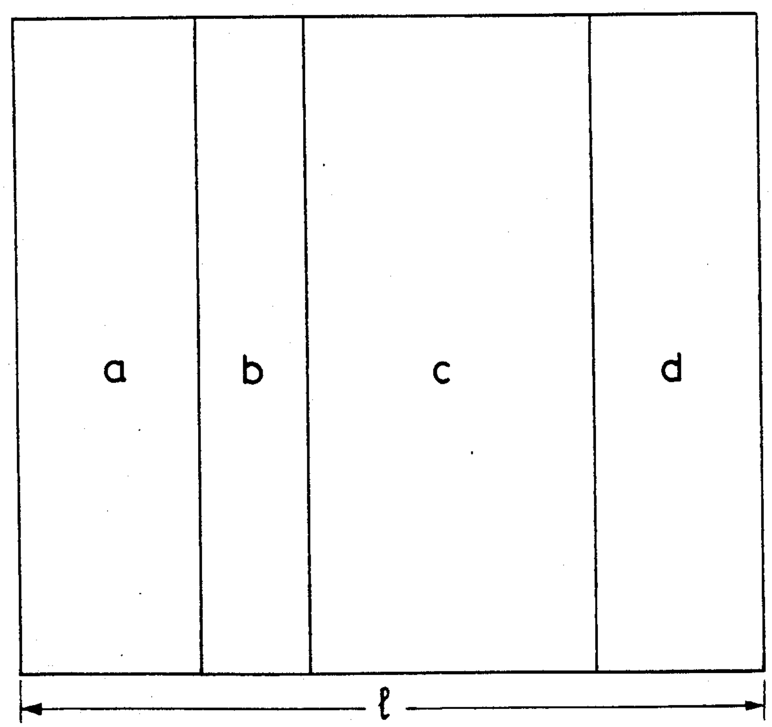
FIG. 3 schematically shows the layout of the usable sections of the sheet of FIG. 2.

The FIGS. 2 and 3 are obviously given purely by way of example, since the number and position of the cuts and, consequently, the dimensions of the strips, depend upon the position and number of the defects in the piece of veneer.

The device 28 can be programmed so as to offer a certain tolerance in the permissible length l, in order to avoid excessively narrow strips, below a given value, whenever a defect has been eliminated close to the cutting position necessary to obtain a sequence of strips of a precise length l.

As soon as there is a sufficient number of adjacent strips on the belt 20 or 21 to form the desired length l (obviously shorter than the length of the belt 20 and 21), the belt is made to move continuously until the strips have been deposited as a sheet on the corresponding stacker to form a layer 29, 30 respectively. After having received the layer, the movable shelf descends a distance equal to the thickness of the sheet so as to be ready to receive a subsequent layer.

The device 28 controls the flap 19 in such a way that a consecutive sequence of strips to be stacked is formed first on one intermittently moving belt and then, while the latter transfers the layer onto the stacker, onto the other intermittently moving belt. By alternately serving the belts 20 and 21 it is possible to achieve a higher operating speed from the entire system.

The disposition of the belts and counterbelts in the sloping portions of the conveyors is advantageously curved (by suitably positioning the rollers supporting them) so that in said portions the belts and counterbelts are pressed against one another and consequently hold the strips tightly between them, thus preventing any relative movement between the strips due to possible vibrations in the conveying system or to the force of gravity.

It is clear, from the foregoing description that a machine applying the principles of the invention can stack strips of wood very rapidly and with a minimum of waste and is also able to easily program both the minimum and maximum width of the strips produced as well as the dimensions of the layers formed with the latter.

The above description is obviously understood as being given merely to illustrate the principles of the invention and should in no way be intended as a limitation of the scope of this invention. For example, it is possible to carry out more complex movements by programming the device 28 so that the distribution of the strips on the belt 20 or the belt 21 is carried out in relation to possible optimizations in the cutting to size in relation to the positions of the defects and, therefore, of the cuts necessary to eliminate the latter.

Moreover, the expert technician can, in the light of the foregoing description, easily imagine possible variations to the embodiment shown herein without departing from the scope of the invention. The disposition of the various devices making up the machine can differ form those described according to the desired overall dimensions. For example, the stackers can be placed one on top of the other in order to reduce the floor space occupied by the machine.

The selecting device 15, described above as vacuum-operated, can also be made using different methods, for example with deflector flaps similar to those used for the deflector 19.

Lastly, taping devices of know type can be provided to lay adhesive tape across the strips once they have been placed side by side on the belts 20, 21 in order to ensure that they move together as one piece.

What is claimed is:

1. A machine for removing defects from pieces of veneer and for forming and stacking sheets of veneer made up from a plurality of strips of veneer placed side by side, comprising conveyor means for feeding pieces of veneer in a first direction, detection means for scanning the pieces to locate defects, a cutter downstream of the detection means for cutting the pieces into strips extending transverse to the direction of travel, means for separating strips containing defects from those free of defects, a first conveyor belt for receiving the strips free of defects from the cutter and conveying them to at least one second conveyor belt having a length longer than the length of the sheet of veneer to be formed, measuring means for determining the width of each strip free of defects being conveyed to the second conveyor belt and control means responsive to the detection means for operating the cutter and separating means to remove strips containing defects from the pieces of veneer fed to the cutter and responsive to the measuring means for intermittently advancing the second conveyor belt a distance equal to the width of the strips received from the first conveyor belt so that the strips accumulate on said second conveyor belt in side by side relationship to form a sheet of veneer of the desired length and thereafter discharging said sheet to a stacking device.

2. The machine of claim 1, including an additional second conveyor belt and deflecting means operated by said control means to selectively direct the strips from the first conveyor belt to either of said second conveyor belts.

3. The machine of claim 1, wherein the control means also operates the cutter in response to the measuring means for cutting a strip from the piece of veneer having a width sufficient to complete the length of the sheet with those strips already accumulated on the second conveyor belt.

4. The machine of claim 2, wherein said deflector means comprises a movable flap.

5. The machine of claim 1, wherein the separating means comprises a deflector located at the outlet of the cutter and operated by the control means that selectively operates in a vacuum mode to hold the strips that are free of defects by suction on the first conveyor belt and alternatively in a blowing mode to blow away the strips containing defects into a discharge outlet for removal.

6. The machine of claim 1, wherein the detection means comprises an optical scanning device located at the inlet of the cutter to identify the defective portions of the pieces of veneer.

7. The machine of claim 1, wherein said first and second conveyor belts comprise a pair of belts and counterbelts with the strips conveyed being located between them.

8. The machine of claim 7, wherein the conveyor belts have sloping portions and the belts and counter-belts are curved in the direction of movement in the sloping portions so as to compress the strips conveyed between them and prevent their relative movement.

* * * * *